United States Patent [19]
Cullen et al.

[11] Patent Number: 6,155,076
[45] Date of Patent: Dec. 5, 2000

[54] METHOD TO OPTIMIZE THERMODYNAMIC EXPANSION IN GAS LIQUEFACTION PROCESSES

[76] Inventors: David M. Cullen, Dairy Cottage, Mid Street, South Nutfield, Surrey RH1 4JU, United Kingdom; Hans E. Kimmel, 4960 S. Virginia St., Reno, Nev. 89502-6016

[21] Appl. No.: 09/192,910

[22] Filed: Nov. 16, 1998

Related U.S. Application Data

[60] Provisional application No. 60/066,084, Nov. 17, 1997.

[51] Int. Cl.$^7$ ....................................................... F25J 3/00
[52] U.S. Cl. .................................. 62/606; 62/657; 62/910
[58] Field of Search .............................. 62/606, 613, 619, 62/910, 657

[56] References Cited

U.S. PATENT DOCUMENTS

| | | | |
|---|---|---|---|
| 3,105,631 | 10/1963 | Hanny | 62/910 |
| 4,281,970 | 8/1981 | Stewart et al. | 417/53 |
| 4,359,871 | 11/1982 | Strass | 62/910 |
| 5,139,548 | 8/1992 | Liu et al. | 62/657 |

Primary Examiner—Ronald Capossela
Attorney, Agent, or Firm—Thomas J. Tighe, Esq.

[57] ABSTRACT

For gas liquefaction processes, thermodynamic expansion is optimized by use of a hydraulic turbine expander for liquefied gases which can be adjusted to different flow rates and differential pressures by varying the rotational speed and/or guide vane position. The turbine expander is disposed in-line between an upstream system for gas liquefaction and a downstream system for liquefied gas handling including a terminal vessel for storage or phase separation. The invention further includes a device to measure the terminal pressure at an inlet pipe of and/or inside the terminal vessel, and a device to control the turbine expander in response to pressure measurements. The turbine controller sets the rotational speed and/or the guide vane position of the expander depending on changes in the terminal pressure such that the pressure inside the terminal vessel remains constant at a certain target value for different thermodynamic, hydraulic or chemical conditions of the gas liquefaction process. In the preferred embodiment the terminal pressure measuring device provides corresponding electronic, optical or mechanical signals to the turbine controller which determines the rotational speed and/or guide vane position in such a way that the pressure drop across the turbine expander and the downstream system continuously meet the target value of the terminal pressure.

8 Claims, 1 Drawing Sheet

METHOD TO OPTIMIZE THERMODYNAMIC EXPANSION IN GAS LIQUEFACTION PROCESSES

This application claims benefit of provisional application 60/066,084, filed Nov. 17, 1997.

FIELD OF INVENTION

This invention relates to gas liquefaction processes using hydraulic turbine expanders to reduce the enthalpy of the condensed gas and to recover power.

BACKGROUND OF INVENTION

Hydraulic turbine expanders are used in process plants for the liquefaction of gases, like air, nitrogen, methane, natural gas and other gases, to reduce the enthalpy of the condensed gas and to recover power. U.S. Pat. No. 3,203,191 describes the usage of turbine expanders in gas liquefaction plants and U.S. Pat. No. 5,659,205 specifies a particular design of a hydraulic turbine expander with variable rotational speed.

A process plant for gas liquefaction consists of various elements. Assuming the hydraulic turbine expander to be the imaginary center of the process, then all elements of the liquefaction process, such as compressors, gas expanders, heat exchangers, valves, orifices and pipes can be collectively defined as systems located either upstream or downstream of the turbine expander.

The upstream system is in general designed to cool down and to condense the gas under higher pressure, and the downstream system is designed to handle the liquefied gas.

The downstream system is connected to the terminal vessel, which could be a storage or a phase separator. The terminal vessel is operated with almost constant pressure, independent of the flow rate. The pressure drop in the downstream and upstream system, due to fluid friction, depends significantly on the squared value of the flow rate and on such parameters as density, viscosity, temperature, mixture and inlet conditions for the upstream system, and it is not possible to predict the pressure drop without a certain margin of error.

It is a characteristic of all rotating fluid machines, including hydraulic turbine expanders, that the ratio between output and input power, the efficiency, depends on the value of the potential and kinetic fluid energy, and reaches a maximum value for a certain differential pressure and flow rate. The maximum value is called Best Efficiency Point. For economic reasons it is always advisable to operate fluid machines at the Best Efficiency Point.

Because of the variation and uncertainty range of the pressure drop in the system, it is prior art to install a control valve preferably between the turbine expander and the downstream system, to meet the conditions for a certain differential pressure and flow rate in order to operate the turbine expander at the Best Efficiency Point.

The pressure drop across the control valve is adjustable and expands exactly the necessary pressure difference to meet the value of the terminal pressure, and to allow the turbine expander to operate at the Best Efficiency Point.

The disadvantage of the prior art is that the control valve reduces the pressure through a Joule-Thompson expansion without power recovery.

To optimize the thermodynamic expansion in gas liquefaction processes the overall Joule-Thompson expansion has to be minimized and replaced by expansions which reduce the enthalpy of the gas and liquefied gas.

SUMMARY OF THE INVENTION

Thermodynamic expansions which reduce the enthalpy of the fluid are achieved through hydraulic turbine expanders, which transform hydraulic energy into work output.

The proposed inventive solution is to eliminate the control valve and to operate the hydraulic turbine expander as a combined turbine and control valve. Turbine expanders with variable rotational speed, as described in U.S. Pat. No. 5,659,205, or with variable guide vane position are able to operate at different differential pressures and different flow rates, and are essentially both, a turbine and a control valve, and therefore can be operated as a combined turbine and control valve.

The thermodynamic expansion through the combined turbine and control valve is an expansion with work output which reduces the enthalpy of the fluid, minimizes the overall Joule-Thompson expansion and optimizes the gas liquefaction process.

The proposed solution provides a device to measure the pressure at the inlet pipe of and/or inside the terminal vessel and a device to control the turbine expander. The terminal pressure controls the rotational speed and/or the guide vane position of the hydraulic turbine expander such that the pressure inside the terminal vessel remains constant at a certain target value for different thermodynamic, hydraulic or chemical conditions of the gas liquefaction process.

The preferred embodiment comprises a device to measure the terminal pressure providing electronic, optical or mechanical signals to a turbine control device which determines the rotational speed and/or guide vane position in such a way that the pressure drop across the turbine expander and the downstream system continuously meets the target value of the terminal pressure.

BRIEF DESCRIPTION OF THE DRAWING FIGURES

The present invention will become more fully understood from the following detailed description, taken in conjunction with the accompanying drawings, wherein like reference numerals refer to like parts, in which:

FIG. 1 is the flow chart of a gas liquefaction process in prior art with turbine expander and separate control valve FIG. 2 is the flow chart of a gas liquefaction process for the present invention with turbine expander operating combined as turbine and control valve, with a device to measure the terminal pressure and with a device for turbine control.

DESCRIPTION OF THE PREFERRED EMBODIMENTS

Figure 1:
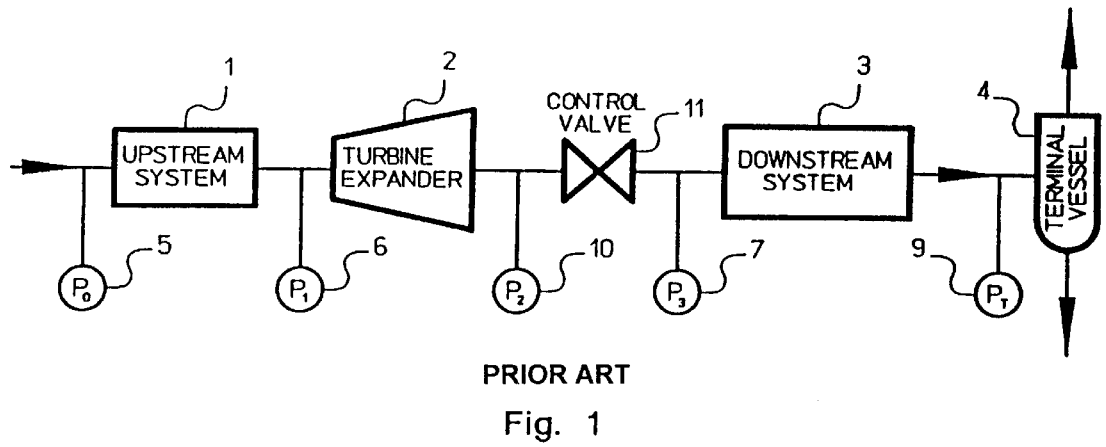

Referring to FIG. 1 which shows the flow chart of a gas liquefaction process in prior art, the turbine expander 2 is assumed to be the imaginary center of the process. The turbine expander is designed with variable rotational speed and/or with variable guide vane position, and able to operate at different differential pressures and different flow rates.

The differential pressure ($P_2-P_1$) is the value of the thermodynamic pressure expansion across the turbine expander 2 with work output, and is measured through the pressure sensors 10 and 6.

The inlet pressure $P_0$ of the upstream system 1 is measured through the pressure sensor 5, and the inlet pressure $P_3$ of the downstream system 3 is measured through pressure sensor 7. The terminal pressure $P_T$ at the inlet pipe of and/or inside the terminal vessel 4 is measured through pressure sensor 9.

To operate the turbine expander 2 at the Best Efficiency Point it is required that the differential pressure ($P_2-P_1$) has a certain value at a certain flow rate depending on the particular design of the turbine expander 2. The inlet pressure $P_0$ and the terminal pressure $P_T$ depend mainly on environmental conditions not directly related to the liquefaction process, and cannot not be controlled by the process.

The pressure difference ($P_1-P_0$) of the upstream system 1 and the pressure difference ($P_T-P_3$) of the downstream system 3 depends significantly on the squared value of the flow rate and on such parameters as density, viscosity, temperature, and mixture, and it is not possible to predict these pressure differences without a certain margin of error.

To match the above described requirement for the Best Efficiency Point of the turbine expander 2, the control valve 11 is adjustable to different pressure differences ($P_3-P_2$) in such a way that the pressure difference (P2–P1) meets the condition for the Best Efficiency Point of the turbine expander 2 under the given values of the pressures $P_0$ and $P_T$. Thus the control valve 11 is adjusting the uncertainty in the total pressure loss (P1–P0)+(PT–P3) of the upstream and downstream system 1 and 3.

The pressure difference (P3–P2) of the control valve 11 is expanded in a thermodynamic Joule-Thompson expansion without work output and without reduction of the enthalpy of the liquefied gas.

Figure 2:
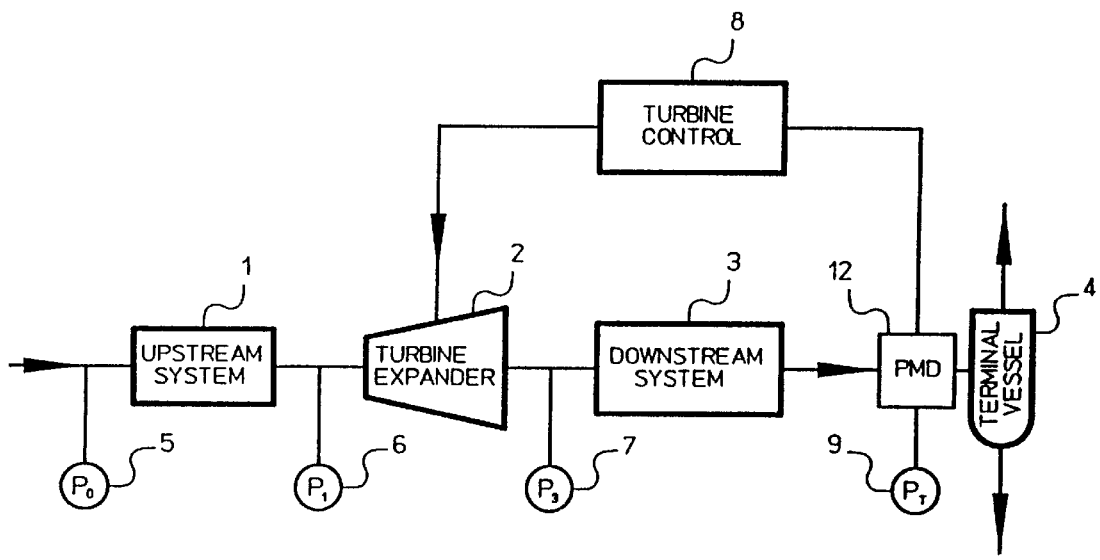

FIG. 2 shows the flow chart of the inventive solution to optimize the thermodynamic expansion of the gas liquefaction process by eliminating the control valve 11.

Using a turbine expander 2 with variable rotational speed and/or with variable guide vane position and providing a device 12 (PMD) to measure the terminal pressure $P_T$ at the inlet pipe of and/or inside the terminal vessel 4, the rotational speed and/or variable guide vane position can be determined in such a way that the exact value of the total pressure difference ($P_3-P_1$) is completely expanded across the turbine expander 2, to meet the correct target value of the terminal pressure $P_T$.

It is no longer necessary to adjust the pressure difference ($P_3-P_2$) with the control valve 11, since the turbine expander 2 with variable rotational speed and/or with variable guide vane position provide a combination of turbine and control valve.

The pressure difference ($P_3-P_2$) is additionally expanded through the turbine with the benefits of enthalpy reduction of the liquefied gas and increased power recovery.

The preferred embodiment provides a device 12 (PMD) to measure the terminal pressure $P_T$ and said device 12 sends electronic, optical or mechanical signals to a turbine control device 8 which determines said rotational speed and/or guide position of the turbine expander 2 in such a way that the pressure drop ($P_3-P_1$) and the pressure drop ($P_T-P_3$) meet the target value of the terminal pressure $P_T$.

This method of controlling the pressure difference of the turbine expander 2 offers a maximum power recovery and enthalpy reduction of the liquefied gas and optimal process improvement for all possible variations in the liquefaction process.

For an alternative embodiment of the invention the device 12 to measure the terminal pressure is a device to measure the volumetric flow rate inside the inlet pipe of the terminal vessel 4 for the purpose of indirectly measuring the terminal pressure through the volumetric flow rate.

In a further embodiment the turbine control device 8 controls in addition to the rotational speed and/or guide vane position also the electrical, mechanical and thermodynamic conditions of the turbine expander 2.

What is claimed is:

1. For a gas liquefaction process having an upstream system, a downstream system and a target terminal pressure, a device for adjusting the pressure differential of the process to generally achieve the target pressure, the device comprising:

(a) a liquified-gas turbine expander having a range of selectable differential pressures, the expander being disposed in-line between the upstream and the downstream systems;

(b) means for measuring the terminal pressure; and (c) means, responsive to terminal pressure measurements, for selecting differential pressures which cause the terminal pressure to continuously converge on the target pressure.

2. The device according to claim 1 wherein the expander further comprises a range of selectable rotational speeds, the differential pressures being dependent upon and corresponding to the rotational speeds.

3. The device according to claim 1 wherein the expander further comprises a range of selectable vane positions, the differential pressures being dependent upon and corresponding to the vane positions.

4. The device according to claim 1 wherein the means for measuring the terminal pressure comprises means for measuring a volumetric flow rate.

5. The device according to claim 2 wherein the means for measuring the terminal pressure comprises means for measuring a volumetric flow rate.

6. The device according to claim 3 wherein the means for measuring the terminal pressure comprises means for measuring a volumetric flow rate.

7. For a gas liquefaction process having an upstream system, a downstream system and a target terminal pressure, a method for maintaining the target terminal pressure comprising the steps:

(a) providing a liquified-gas turbine expander having a range of selectable differential pressures, the expander being disposed in-line between the upstream and the downstream systems;

(b) providing a sensor to measure the terminal pressure; and (c) providing a device, responsive to terminal pressure measurements, for selecting differential pressures which cause the terminal pressure to continuously converge on the target pressure.

8. The device according to claim 7 wherein the step of providing a sensor comprises the step of providing a device for measuring a volumetric flow rate.

* * * * *